United States Patent [19]

Pannell et al.

[11] Patent Number: 4,848,808
[45] Date of Patent: Jul. 18, 1989

[54] MECHANICAL PIPE JOINT

[75] Inventors: Minor W. Pannell; Alton L. Meadows, both of Tyler, Tex.

[73] Assignee: Tyler Pipe Industries, Inc., Tyler, Tex.

[21] Appl. No.: 248,098

[22] Filed: Sep. 23, 1988

[51] Int. Cl.⁴ .............................................. F16L 19/02
[52] U.S. Cl. ..................................... 285/337; 285/374; 285/404; 285/4; 285/39
[58] Field of Search ................. 285/337, 90, 404, 403, 285/382.7, 382, 4, 39

[56] References Cited

U.S. PATENT DOCUMENTS

| 1,979,255 | 11/1934 | Engel | 285/337 |
| 3,885,818 | 5/1975 | Ammann | 285/404 X |
| 4,092,036 | 5/1978 | Sato | 285/337 |
| 4,417,754 | 11/1983 | Yamaji | 285/404 X |

FOREIGN PATENT DOCUMENTS

| 0551768 | 6/1932 | Fed. Rep. of Germany | 285/337 |
| 2430562 | 3/1980 | France | 285/404 |
| 0463209 | 11/1968 | Switzerland | 285/337 |
| 0494735 | 10/1938 | United Kingdom | 285/337 |

Primary Examiner—Dave W. Arola
Assistant Examiner—P. Frechette
Attorney, Agent, or Firm—Michael A. O'Neil

[57] ABSTRACT

A mechanical pipe joint comprising a substantially cylindrical body integrally formed with a plurality of pipe restraining members, and a plurality of pipe clamping members, each comprising at least one block slidably engaged with a pipe restraining member, a compressible gasket for graduating suddenly applied forces, and restraining bolts. The clamping system, acting to distribute the clamping forces on a large portion of the surface area of a pipe, simultaneously absorbs and graduates suddenly applied forces, preventing failure of the pipe point.

7 Claims, 3 Drawing Sheets

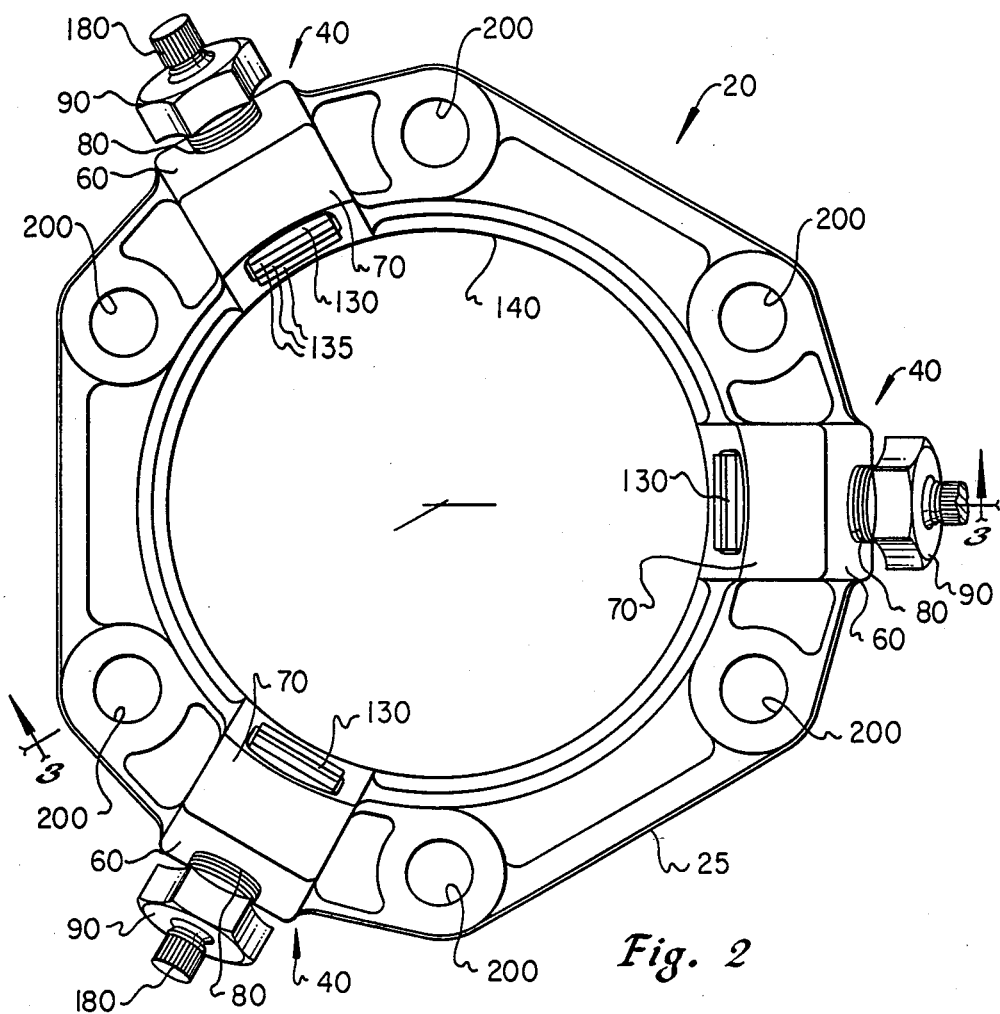
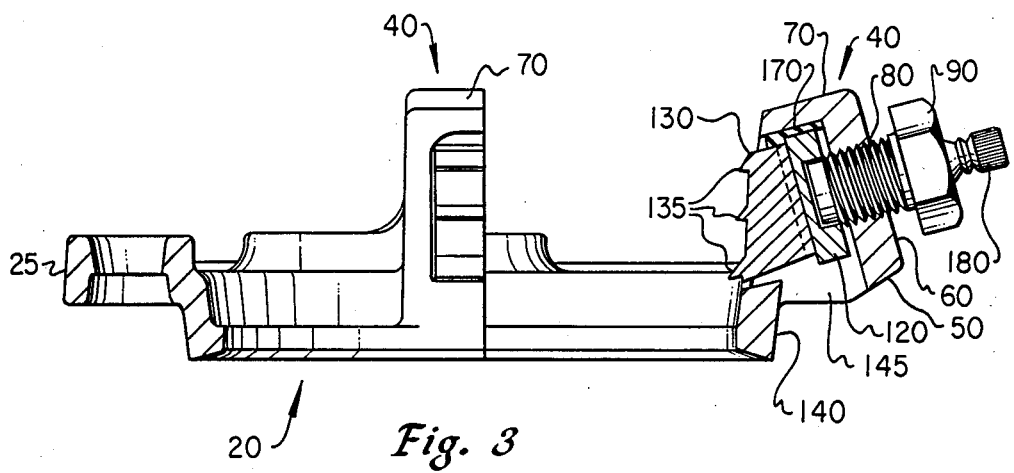
Fig. 2
Fig. 3

MECHANICAL PIPE JOINT

TECHNICAL FIELD

The present invention relates to mechanical pipe joints, and more particularly to mechanical pipe joints utilizing pipe clamping systems.

BACKGROUND OF THE INVENTION

Currently, different types of mechanical pipe joints are used in the construction of pipelines carrying various fluids. These pipe joints, however, are susceptible to numerous failures for a number of reasons. Some prior art pipe joints, for example, use clamping devices such as bolts which contact a very small surface area on the exterior wall of the pipe. If the bolts are inadvertantly over-tightened, the bolts may penetrate or crack the wall of the pipe, thereby causing the pipe to leak. Alternatively, if the bolts are not strong enough, when the pipe joint is subjected to axial forces tending to pull the joint apart, the bolts will bend or break and the pipe joint will fail.

Other prior art pipe joints employ clamping devices designed to spread the clamping forced over a larger surface area of the pipe. While these pipe joints may succeed in distributing the clamping force over a larger surface area of the pipe, these devices make no provision for absorbing or graduating the effect of suddenly applied forces. A pipe joint can be subjected to massive forces occurring almost instantaneously. These forces may be the result of a rapid acceleration or deceleration of the rate of fluid flow through the pipe. For example, when a large valve on a high pressure water line is suddenly opened opened or closed, the axial forces resulting from the near-instantaneous acceleration or deceleration of the water in the pipe are almost instantly transmitted to the pipeline and subsequently the pipe joints. Prior art pipe joints subjected to these types of forces are subject to failure because such prior art mechanical pipe joints make no provision for absorbing or graduating these forces.

SUMMARY OF THE INVENTION

The present invention provides a mechanical pipe joint which alleviates the problems presented by prior art pipe joints. Particularly, the present invention provides a mechanical pipe joint which employs clamping means which spread clamping forces over a large portion of the surface area of the exterior wall of the pipe to be joined. The present invention also provides a mechanical pipe joint which is not susceptible to breakage resulting from the sudden application of forces to the pipe that are transmitted to the pipe joint.

The present invention is a mechanical pipe joint comprising a substantially cylindrical body defined by interior and exterior perimeters, the interior perimeter defining a central circular opening corresponding to the diameter of a first pipe upon which the pipe joint is mounted. The interior perimeter is formed into a tapered flange which fits into a flanged enlarged bell-shaped opening in a second pipe. A suitable packing is placed between the tapered flange and the second pipe in order to facilitate sealing the joint. The pipe joint is conventionally coupled to the second pipe by means of T-bolts passing through the through holes in the flange of the second pipe and through holes adjacent to the exterior perimeter of the mechanical pipe joint.

The pipe joint of the present invention is constructed with integrally formed pipe restraining members on the side of the joint opposite the flange of the second pipe. The pipe restraining members of the pipe joint of the present invention comprise a front wall formed by the substantially cylindrical body of the pipe joint, a slotted bottom wall, parallel sidewalls extending away from the front wall, a back wall and a top wall which is inclined away from the front wall. A threaded hole passes through the center of the top wall of the pipe restraining member at an angle perpendicular to the top wall.

A unique clamping system is used in conjunction with the pipe restraining members to clamp the pipe joint of the present invention onto the pipe. This unique clamping system distributes the clamping forces over a large surface area, while simultaneously providing means for absorbing or graduating the effect of suddenly applied forces. A substantially rectangular first block is slidably mounted in the slot in the bottom wall of the pipe restraining member on flanges extending along the sides of the block. The flanges on the first block prevent the block from falling through the slotted bottom wall of the pipe restraining member after initial assembly and prior to installation. The portion of the first block extending from the slot in the bottom wall of the pipe restraining member is formed into multiple inclined wedge shaped teeth that engage the pipe wall when the mechanical pipe joint is installed.

A second block is slidably mounted within the pipe restraining member on top of the first block. The second block is a substantially rectangular block formed with a non-threaded hole in the top of the block. The non-threaded hole is perpendicular to the top of the block and passes partially through the block. A compressible gasket is positioned between the back wall of the pipe restraining member and the first and second blocks. A restraining bolt is threadably engaged in the threaded hole in the top wall of the pipe restraining member. A non-threaded portion of the shank of the restraining bolt is fitted into the hole in the top of the second block. Thus, when the restraining bolt is tightened, the force generated is transmitted through the blocks, causing the teeth of the first block to engage the exterior wall of a pipe.

This unique combination of clamping elements, comprising a restraining bolt, first and second blocks, and a compressible gasket securely holds the pipes in position while simultaneously providing a means for graduating or absorbing forces which are suddenly applied to the pipes and consequently transmitted to the pipe joint. When an axial force tending to pull the pipes apart is suddenly applied, the teeth of the first block, being inclined relative to the outside wall of the pipe, tend to bit deeper into the pipe. Simultaneously, the first block may slide along the second block against the compressible gasket. The compressible gasket in turn graduates and absorbs the sudden forces applied, thereby preventing the breakage of any of the components of the clamping system or the pipe restraining member.

A second embodiment of the clamping system of the mechanical pipe joint of the present invention substitutes a one-piece pipe restraining block for the first and second blocks described earlier. The one-piece pipe restraining block comprises a hollow block, open-ended on the front side, with a non-threaded, elliptical hole in the back wall of the block. The ends of the top and bottom walls opposite the back wall of the one-piece pipe restraining block are formed into pipe restraining teeth. The one-piece pipe restraining block is slidably retained within a pipe restraining member on a non-threaded portion of the shank of a restraining bolt.

A compressible gasket is positioned between the one-piece pipe restraining block and the back wall of the pipe restraining member. When an axial force tending to pull the pipes apart is suddenly applied, the teeth of the one-piece pipe restraining block tend to bite into the exterior wall of the pipe. Since the hole in the back wall of the one-piece pipe restraining block is elliptical, the one-piece block may slide toward the back wall of the pipe restraining member when a sudden force is applied, transmitting the force to the compressible gasket. The compresssible gasket, in turn, graduates or absorbs the forces transmitted to it by the one-piece pipe restraining block, thereby preventing breakage of any of the components of the clamping system or the pipe restraining member.

The mechanical pipe joint of the present invention is superior to the prior art in that it provides a clamping system over a large surface area and also provides means for absorbing and graduating suddenly applied forces which might otherwise break one or more components of the pipe joint. Other objects, features and advantages of the present invention will become apparent from the Detailed Description given herein; it should be understood, however, that the Detailed Description and specific examples, while indicating preferred embodiments of the invention, are given by way of illustration only, since various changes and modifications within the spirit and scope of the invention will become apparent to those skilled in the art from the Detailed Description.

BRIEF DESCRIPTION OF THE DRAWINGS

A more complete understanding of the invention and its advantages will be apparent from the Detailed Description taken in conjunction with the accompanying Drawings, in which:

FIG. 2 is an end view of the pipe joint of FIG. 1.

FIG. 3 is a sectional view taken along lines 3—3 of FIG. 2.

DETAILED DESCRIPTION OF THE DRAWINGS

Figure 1:
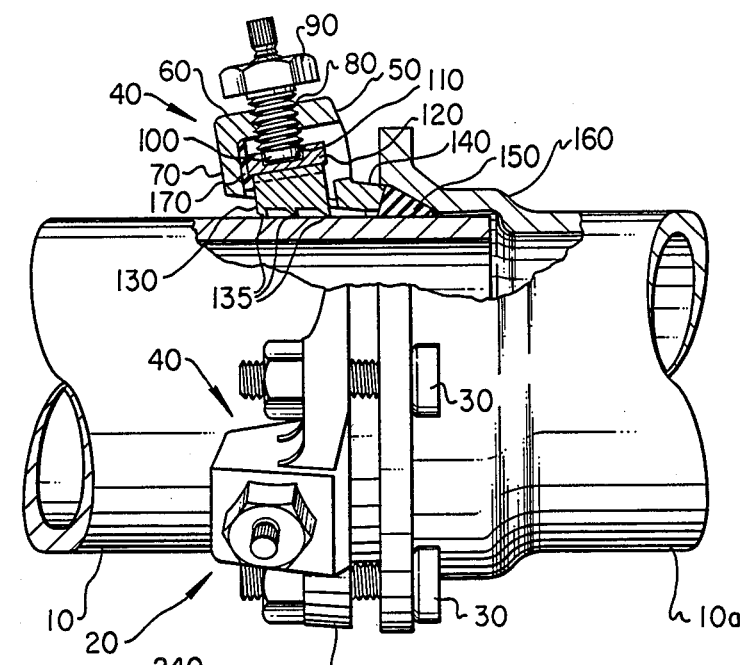
FIG. 1 is a partial sectional view of the pipe joint of the present invention installed on two joined pipes.

Referring now to FIG. 1, a mechanical pipe joint 20 incorporating the present invention is shown installed on pipes 10 and 10A. The pipe joint 20 comprises a substantially cylindrical body 25 shown joining pipes 10 and 10A by means of T-bolts 30 and pipe restraining members 40. The pipe restraining member 40 comprises a front wall 50, a top wall 60, and a back wall 70. The top wall 60 has a centrally located threaded hole 80 which is perpendicular to the top wall 60. A first block 130 is slidably mounted in pipe restraining member 40 and has pipe engaging teeth 135. A second block 120 is slidably engaged with the top of the first block 130, and has a centrally located non-threaded hole 110 engaged by a non-threaded portion 100 of the shank of a restraining bolt 90. The leading edge of the cylindrical body 25 is formed into a tapered flange 140 which compresses a packing 150 positioned between first pipe 10 and the enlarged bell-shaped section 160 of the second pipe 10A.

The pipe joint of the present invention is installed as illustrated in FIG. 1 so that the parts are positioned approximately as shown in FIG. 1. In the event that pipes 10 and 10A are subjected to a force tending to disjoint the ends of the pipes 10 and 10A, the teeth 135 resist the movement of pipe 10 by biting into the exterior wall of pipe 10. The teeth 135 tend to bite more deeply into the exterior wall of the pipe and resist movement of the pipe as the disjointing force is increased.

Referring to FIGS. 1 and 3, pipe restraining member 40 would ordinarily be subject to breakage upon a sudden application of disjointing force to the pipes 10 and 10A. However, the pipe restraining member 40 is protected from sudden shock by the unique combination of first slidably mounted block 130, second block 120 slidably engaged with first block 130, and compressible gasket 170. When a sudden force is applied, the first block 130, being independent of the second block 120 and the restraining bolt 90, may slide along the face of second block 120 and against the compressible gasket 170, thereby graduating the effect of the sudden application of force. The compressible gasket 170 also tends to graduate any application of force to the second block 120 resulting from sudden forces acting on the pipes 10 and 10A.

FIG. 2 is an end view of the pipe joint 20 showing the relative positions of pipe restraining members 40 and non-threaded T-bolt through holes 200. The restraining bolts 90 have splined twist-off lugs 180. The splined twist-off lugs 180 are designed to break off of the restraining bolt 90 upon the application of a predetermined torque. Thus, by applying a suitable wrench to the twist-off lugs 180, and tightening the restraining bolts 90 until the twist-off lug 180 breaks off, the restraining bolts 90 are tightened to the proper torque.

FIG. 3 is a sectional drawing taken along lines 3 illustrated in FIG. 2. FIG. 3 further illustrates the relative position of the first block 130, second block 120, and compressible gasket 170, within the pipe restraining member 40.

Figure 4:
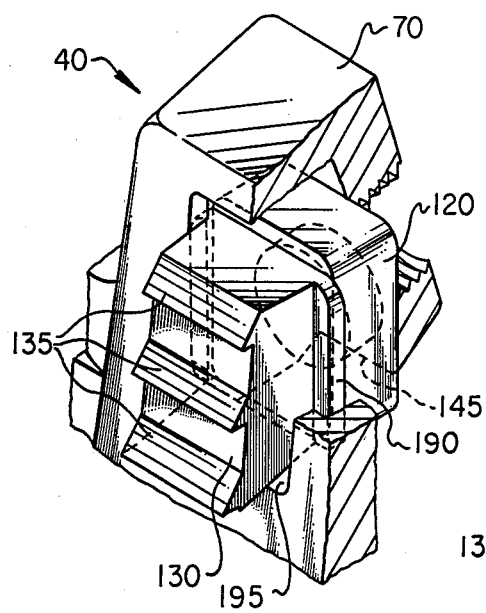
FIG. 4 is an exploded perspective view of a multi-component pipe clamping system used in the present invention.

FIG. 4 illustrates the means retaining first block 130 in pipe restraining member 40 after initial assembly and prior to installation. First block 130 is shown with retaining flange 190. Pipe restraining member 40 is illustrated with slotted bottom wall 195. When first block 130 is inserted into the pipe restraining member 40, retaining flanges 190 and slotted bottom wall 195 cooperate to retain first block 130 in pipe restraining member 40.

Figure 5:
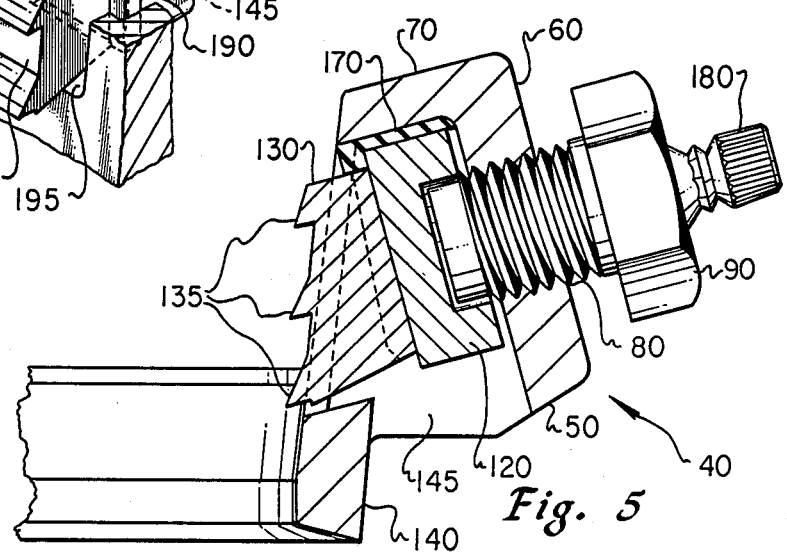
FIG. 5 is a sectional view of the pipe restraining member of the present invention further illustrating the clamping system.

Referring now to FIGS. 3 and 5, FIG. 5 is an enlarged sectional view of pipe restraining member 40 further illustrating the relative positions of first block 130, second block 120, and compressible gasket 170.

First block 130 and second block 120 are installed in the pipe restraining member 40 by inserting the blocks through receiving hole 145.

Figure 6:
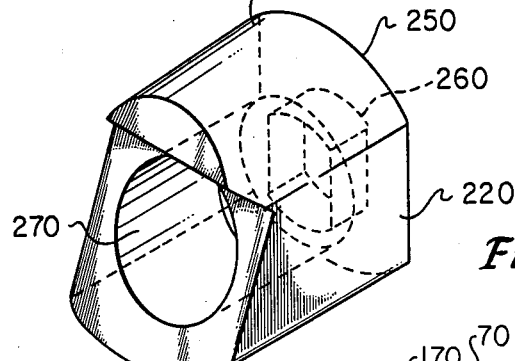
FIG. 6 is a perspective view of a one-piece pipe restraining block.

FIG. 6 illustrates an alternate one-piece embodiment of first block 130 and second block 120 of the previous figures. The one-piece block 210 is shown in FIG. 6 with parallel side walls 220, bottom wall 230, top wall 240, and back wall 250. The back wall 250 is formed with an elliptical hole 260, which is smaller in diameter than the internal opening 270 defined by the side walls 220, top wall 240, and bottom wall 230.

Figure 7:
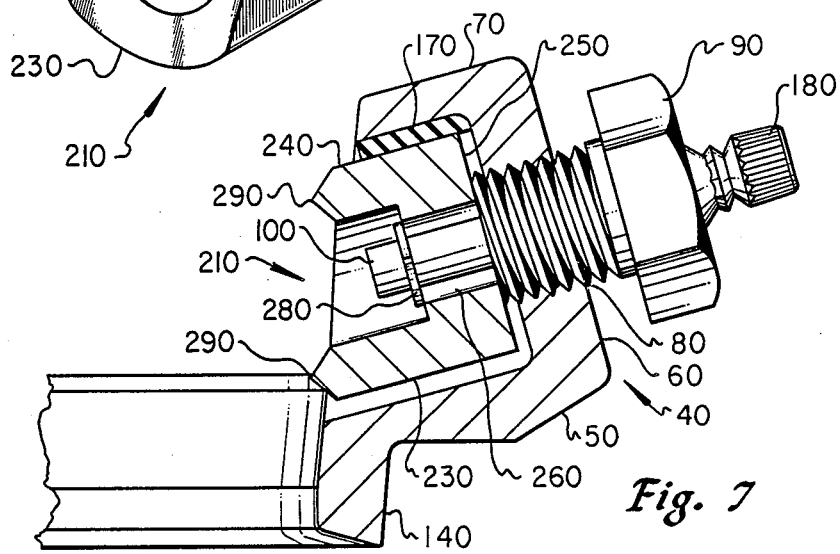
FIG. 7 is a sectional view of a second embodiment of the present invention in which a one-piece pipe restraining block is retained on a restraining bolt by means of a snap ring.

FIG. 7 is a sectional drawing which illustrates a second embodiment of the invention wherein the one-piece block 210 of FIG. 6 is slidably mounted within a pipe restraining member 40. The non-threaded portion 100 of the shank of the restraining bolt 90 extends through elliptical hole 260 in the back wall 250 of the one-piece block 210. The one-piece block 210 is retained on the non-threaded portion 100 of the shank of the restraining bolt 90 by means of a snap ring 280. The top wall 240 and the bottom wall 230 of the one-piece block 210 are formed into pipe engaging teeth 290 at their respective ends. Thus, when a sudden force is applied to one-piece pipe block 210, elliptical hole 260 allows one-piece block 210 to slide against compressible gasket 170, thereby graduating the effect of the sudden force.

Figure 8:
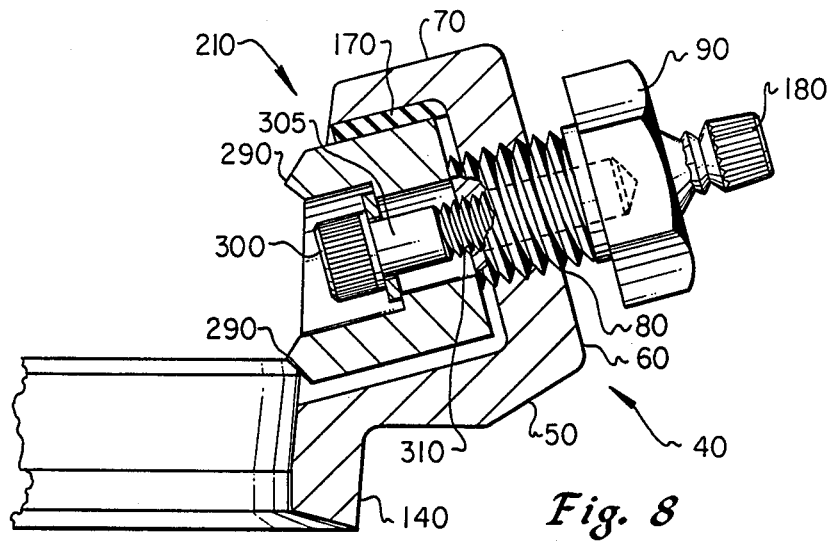
FIG. 8 is a sectional view of a third embodiment of the present invention in which a one-piece pipe restraining block is retained on the restraining bolt by means of a threaded screw.

FIG. 8 is a sectional view which illustrates a third embodiment of the invention wherein the one-piece block 210 is slidably mounted within a pipe restraining member 40 upon non-threaded portion 305 of the shank of socket head cap screw 300. The socket head cap screw 300 is threadably engaged in threaded hole 310 in the shank of the restraining bolt 90.

While the invention has been described in connection with the illustrated embodiments, it is not intended to limit the scope of the invention to the particular forms set forth, but, on the contrary, it is intended to cover such alternatives, modifications, and equivalents as may be included within the spirit and scope of the invention as defined in the appended claims.

We claim:

1. A mechanical pipe joint comprising:
   a substantially cylindrical collar surrounding a pipe;
   a plurality of circumferentially spaced pipe restraining members, integrally formed with said collar and extending parallel to the longitudinal axis of said pipe from one end of said collar;
   each of said pipe restraining members comprising a central cavity opening toward said pipe, said cavity defined by a top wall, a front wall, a back wall and side walls, each of said top walls being formed with a threaded aperture;
   at least one block being slidably supported in each of said central cavities;
   a plurality of restraining bolts, each threadably engaging said threaded aperture and non-threadably engaging said block, said restraining bolt cooperating with at least one block to forcibly cause said at least one block to engage said pipe;
   means permitting predetermined limited longitudinal movement of said block relative to said restraining bolt and said central cavity to accommodate movement; and
   resilient cushioning means interposed between said block and said pipe restraining member.

2. A mechanical pipe joint in accordance with claim 1 wherein said pipe restraining member is formed with a slotted bottom wall.

3. A mechanical pipe joint in accordance with claim 1, further comprising slidably engaging first and second blocks, said first block formed with pipe engaging teeth, said second block non-threadably engaging said restraining bolt.

4. A mechanical pipe joint in accordance with claim 1 wherein said pipe restraining bolt is formed with a threaded and non-threaded shank portion, said non-threaded shank portion being slidably engaged with at least one block in each of said pipe restraining members.

5. A mechanical pipe joint in accordance with claim 1 wherein the shank of said pipe restraining bolt is formed with a longitudinally extending interior threaded hole, said interior hole being threadably engaged by a second bolt comprising a threaded and non-threaded shank portion, said non-threaded shank portion of said second bolt being slidably engaged with at least one block in each of said pipe restraining members.

6. A mechanical pipe joint in accordance with claim 1 wherein a single block forms pipe engaging teeth, said single block being slidably supported on said restraining bolt within each of said pipe restraining members.

7. A mechanical pipe joint comprising:
   a substantially cylindrical collar surrounding a pipe;
   a plurality of circumferentially spaced pipe restraining members, integrally formed with said collar and extending parallel to the longitudinal axis of said pipe from one end of said collar;
   each of said pipe restraining members comprising a rectangular central cavity opening toward said pipe, said cavity defined by a top wall, a front wall, a back wall, parallel side walls and a slotted bottom wall, said top wall being formed with a threaded aperture;
   a first block, slidably supported in said slotted bottom wall of each of said pipe restraining members;
   a second block, slidably mated to said first block within said central cavity in each of said pipe restraining members;
   a plurality of restraining bolts, each threadably engaging said threaded aperture and non-threadably engaging said second block, said restraining bolt cooperating with said first and second block to forcibly cause said first block to engage said pipe;
   means permitting predetermined limited longitudinal movement of said first block relative to said restraining bolt and said rectangular cavity; and
   a plurality of resilient cushioning means interposed between each of said pipe restraining members and said first and second blocks.

* * * * *